United States Patent
Niemann

(10) Patent No.: US 6,591,006 B1
(45) Date of Patent: Jul. 8, 2003

(54) INTELLIGENT IMAGE RECORDING SYSTEM AND METHOD

(75) Inventor: James C. Niemann, Dallas, TX (US)

(73) Assignee: Electronic Data Systems Corporation, Plano, TX (US)

(*) Notice: Subject to any disclaimer, the term of this patent is extended or adjusted under 35 U.S.C. 154(b) by 0 days.

(21) Appl. No.: 09/339,330

(22) Filed: Jun. 23, 1999

(51) Int. Cl.[7] .................................................. G06K 9/00
(52) U.S. Cl. ........................ 382/162; 382/107; 348/154
(58) Field of Search ................................. 382/162, 165, 382/100, 305, 103, 107, 115, 173–174, 236, 226, 270, 271, 218–221; 348/699–700, 143, 152–155

(56) References Cited

U.S. PATENT DOCUMENTS 5,034,986 A * 7/1991 Karmann et al. ............ 382/103
6,035,067 A * 3/2000 Ponticos ...................... 382/226
6,130,707 A * 10/2000 Koller et al. ................ 348/155
6,335,976 B1 * 1/2002 Belmares .................... 382/103

* cited by examiner

Primary Examiner—Phuoc Tran
Assistant Examiner—Ishrat Sherali
(74) Attorney, Agent, or Firm—Baker Botts L.L.P.

(57) ABSTRACT

A method for intelligent image recording includes receiving a first image (44) and a second image (46) from an image source (18). The method also includes automatically determining variations between the first image (44) and the second image (46). The method further includes recording the second image (46) if the variations exceed a predetermined value. Determining variations between the first and second images (44,46) may include determining and comparing pixel color values for pixels of the first image (44) with corresponding pixels of the second image (46).

26 Claims, 2 Drawing Sheets

INTELLIGENT IMAGE RECORDING SYSTEM AND METHOD

TECHNICAL FIELD OF THE INVENTION

This invention relates in general to the field of image recording, and more particularly, to an intelligent image recording system and method.

BACKGROUND OF THE INVENTION

Many people and companies use surveillance equipment for maintaining the security of their homes and businesses. For example, video cameras may be used to monitor a parking facility of an office building. Images from the video camera may be recorded on videotape to provide a record of activity of the surveillance site. The videotapes containing the recorded images may be viewed by security personnel or stored for future use.

SUMMARY OF THE INVENTION

Known systems and methods present certain drawbacks. For example, recorded images from video surveillance cameras may span several hours. A daily review of the recorded images may be time consuming and impractical. Additionally, videotapes containing the recorded images may be lost, misplaced, or damaged, resulting in an inability to review the recorded images. Further, for example, storing the recorded images for future use may require a large, climate-controlled storage facility to preserve the integrity of the stored images.

Accordingly, a need has arisen for an intelligent image recording system and method. The present invention provides an intelligent image recording system and method that addresses shortcomings of prior systems and methods.

According to one embodiment of the present invention, a method for intelligent image recording includes receiving a first image and a second image from an image source. The method also includes automatically determining variations between the first and second images. The method further includes recording the second image if the variations exceed a predetermined value.

According to another embodiment of the present invention, an intelligent image recording system includes a processor operable to receive a first image and a second image from an image source. The system also includes a computer-readable storage medium coupled to the processor and a computer program encoded on the computer-readable storage medium executable by the processor. The computer program is operable to automatically determine variations between the first and second images. Additionally, the processor is further operable to record the second image if the variations exceed a predetermined value.

The present invention provides several technical advantages. According to an aspect of the invention, analog images may be digitally captured and compared to determine variations between images. If the variations exceed a predetermined value, the image may be digitally recorded. Thus, under certain circumstances, relatively fewer images may be recorded, thereby requiring less time to review. Additionally, the recorded images may be compressed, thereby requiring less storage space. Further, recorded digital images may be simultaneously delivered to more than a single storage device, enabling redundant real-time storage of the digital images.

Other aspects and technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following description, taken in conjunction with the accompanying drawings, in which.

DETAILED DESCRIPTION OF THE PREFERRED EMBODIMENTS

An intelligent image recording system and method are provided in which images may be compared to determine variations between the images. If the variations exceed predetermined values, the images may be recorded and stored. When the variations do not reach the predetermined values, the system may dispense with recording. Thus, for example, a certain level of activity in an area over a period of time may be captured with relatively fewer images.

Among other things, the system may include a comparison application computer program for automatically determining variations, such as pixel color value variations, between a reference image and a comparison image. The system enables recording of the comparison image if the variations between the comparison and reference images exceed a predetermined value. The comparison image may be recorded with a time stamp to establish a time that the image was recorded. The comparison image may also be recorded in a compressed format, thereby requiring less storage space.

The preferred embodiments of the present invention are best understood by referring to the following description and drawings, wherein like numerals are used for like and corresponding parts of the various drawings.

Figure 1:
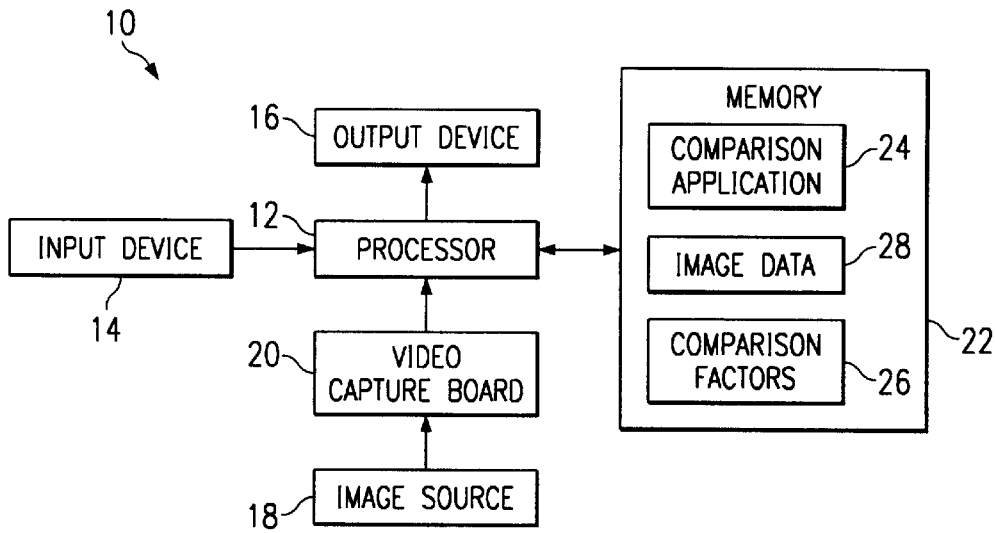
FIG. 1 is an exemplary intelligent image recording system in accordance with an embodiment of the present invention.

FIG. 1 depicts an exemplary intelligent image recording system 10 in accordance with an embodiment of the present invention. System 10 comprises a processor 12, an input device 14, an output device 16, an image source 18, a video capture board 20, and a memory 22. The present invention also encompasses computer software that may be stored in memory 22 and executed by processor 12. The computer software may also be stored in a variety of other types of storage media including, but not limited to, floppy disk drives, hard drives, CD ROM disk drives, or magnetic tape drives. Data may be received from a user of system 10 using a keyboard or any other type of input device 14. Results may be output to a user of image recording system 10 through output device 16, which may include a display, storage media, or any other type of output device.

Intelligent image recording system 10 includes a comparison application 24, which is a computer software program. In FIG. 1, comparison application 24 is illustrated as being stored in memory 22, where it can be executed by processor 12. Comparison application 24 may also be stored on a variety of other types of storage media. Comparison application 24 automatically determines differences or variations between images received from image source 18. Comparison application 24 also determines whether the variations among the images warrant recording the images.

In the embodiment illustrated in FIG. 1, intelligent image recording system 10 includes image source 18 and video capture board 20 for providing digitized images to processor 12. By way of example, image source 18 may include, but is not limited to, a camera, camcorder, or VCR, for providing analog input to video capture board 20. Video capture board 20 receives the analog input from image source 18 and creates digitized images for each frame of the analog input. It will be understood that image source 18 may provide images directly to processor 12. For example, image source 18 may include, but is not limited to, a digital camera providing digital image input to processor 12.

Intelligent image recording system 10 illustrated in FIG. 1 also includes comparison factors 26 stored in memory 22. Comparison factors 26 include attributes and values to be used in determining whether variations between images warrant recording of images. For example, as will be described in greater detail below, comparison factors 26 may include pixel color value ranges or a pixel ratio for determining whether variations between images warrant recording of images. However, any attribute or criteria that can change over time may be included in comparison factors 26.

Intelligent image recording system 10 may also include image data 28 stored in memory 22. Image data 28 may include image information used by comparison application 24 for determining variations between images. For example, image data 28 may include image information for each image received from image source 18. Image data 28 may also include images recorded using comparison application 24.

Figure 2:
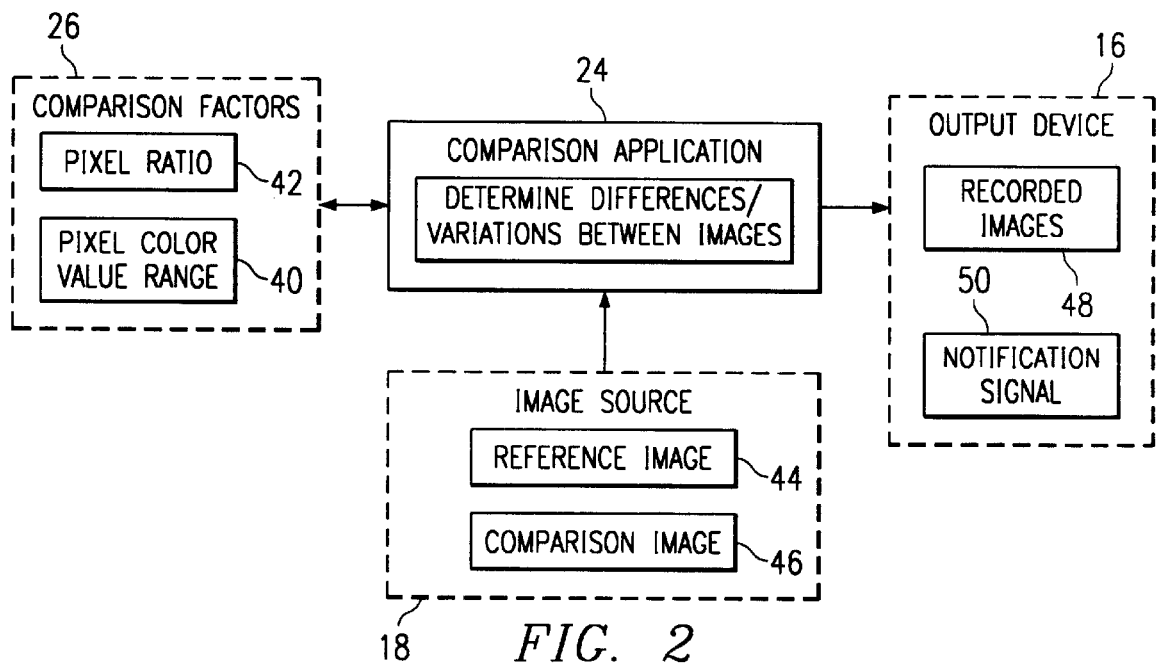
FIG. 2 is an exemplary intelligent image recording system in accordance with an embodiment of the present invention.

FIG. 2 is an example of intelligent image recording system 10 in accordance with an embodiment of the present invention. In operation, a user of system 10 may have the option of selecting or inputting one or more comparison factors 26 used for comparing images received from image source 18. In the embodiment illustrated in FIG. 2, comparison factors 26 include a pixel color value range 40 and a pixel ratio 42. For example, digital images may include a plurality of pixels, each pixel having a color for defining a portion of the digital image. The color of each pixel may be given a distinct value associated with the color of the pixel. For example, black and white digital images may be defined by fifty-six different shades of gray extending on a scale from white to black. Thus, each pixel of the black and white digital image may include a pixel color value corresponding to the shade of gray the pixel represents in the digital image. It should be understood that pixel color values for color digital images may also be defined. For example, color images may be defined using different shades of the primary colors of red, yellow, and blue, each of the primary colors being available in different shades on a scale from dark to light. For example, a 3-digit pixel color value may be defined for each pixel of a color digital image.

Pixel color value range 40 may include a range of pixel color values used for determining variations between digital images. For example, comparison application 24 may determine variations between a first image and a second image. The first and second images may be, respectively, a reference image 44 and a comparison image 46. Reference image 44 and comparison image 46 may represent sequential images in a series of images received from image source 18. However, reference image 44 may also represent any recorded image, such as the last image recorded by processor 12, and comparison image 46 may represent any subsequent image in the series of images. Thus, reference image 44 may remain the same for multiple comparisons or may change. For example, reference image 44 could change periodically either by a certain time interval or by numbers of images in a sequence, or reference image 44 could be replaced by the next comparison image 46 that is recorded.

Comparison application 24 may determine a pixel color value for each pixel of reference image 44 and comparison image 46. Comparison application 24 may determine variations between reference image 44 and comparison image 46 by comparing corresponding pixels of reference image 44 and comparison image 46. Pixel color value range 40 may include a predetermined value reflecting a required variation between corresponding pixels of reference image 44 and comparison image 46 before comparison application 24 causes recording of comparison image 46. For example, a predetermined value of plus or minus five may be selected for pixel color value range 40. Comparison application 24 may detect a variation between reference image 44 and comparison image 46. If a pixel of comparison image 46 has a pixel color value greater than plus five or less than minus five compared to a corresponding pixel color value of reference image 44, then comparison application 24 may cause comparison image 46 to be recorded. If a color value of a pixel of comparison image 46 is within pixel color value range 40 of the color value of the corresponding pixel of reference image 44, comparison application 24 may treat the pixel of comparison image 46 as unchanged.

Pixel color value range 40 may be selected depending on conditions at image source 18. For example, pixel color value range 40 may be selected to compensate for lighting variations at image source 18. For example, fluorescent lighting may cause pixel color values to vary a slight degree without rendering a substantial change between images. Thus, pixel color value range 40 may be determined by evaluating conditions at image source 18 from which reference image 44 and comparison image 46 are received.

Pixel ratio 42 may include a predetermined ratio value for comparing reference image 44 and comparison image 46. For example, comparison application 24 may determine that comparison image 46 includes one thousand pixels. Comparison application 24 may also determine that five hundred pixels of comparison image 46 have pixel color values different from corresponding pixels of reference image 44. Thus, comparison application 24 may determine a pixel ratio of fifty percent for comparison image 46. Additionally, comparison application 24 may compare the pixel ratio determined for comparison image 46 with pixel ratio 42. For example, if the pixel ratio determined for comparison image 46 exceeds the predetermined value of pixel ratio 42, comparison image 46 may be recorded. Therefore, pixel ratio 42 and pixel color value range 40 may be selected for determining whether variations between comparison image 46 and reference image 44 warrant recording of comparison image 46.

After comparing reference image 44 and comparison image 46, comparison application 24 determines whether variations between comparison image 46 and reference image 44 warrant recording of comparison image 46. If variations between reference image 44 and comparison image 46 exceed predetermined values, such as pixel color value range 40 and/or pixel ratio 42, comparison application 24 records comparison image 46. Output of comparison application 24 is identified in FIG. 2 as recorded images 48. Recorded images 48 may be displayed or stored in a variety of storage media. Additionally, recorded images 48 may be stored in a compressed format, thereby reducing an amount of storage space required for recorded images 48.

Comparison application 24 may also be configured to notify a user of system 10 that an image has been recorded. For example, a notification signal 50 may be transmitted to output device 16, thereby alerting the user that an image has been recorded. Thus, system 10 provides greater efficiency than prior systems by providing notification of variations necessitating recording of an image. For example, notification signal 50 may be used to alert security personnel to varying conditions at the location of image source 18, thereby substantially eliminating a requirement of constant surveillance or continuous monitoring of an output device such as a display.

Comparison application 24 may also be configured to compare portions of reference image 44 and comparison image 46. For example, a surveillance area may include objects subject to movement or motion, such as windblown trees and the like. Additionally the surveillance area may include areas deemed not of interest or importance, such as ceiling areas of a parking garage. Thus, comparison application 24 may be configured to compare only corresponding portions of reference image 44 and comparison image 46 for determining variations between reference image 44 and comparison image 46.

Figure 3:
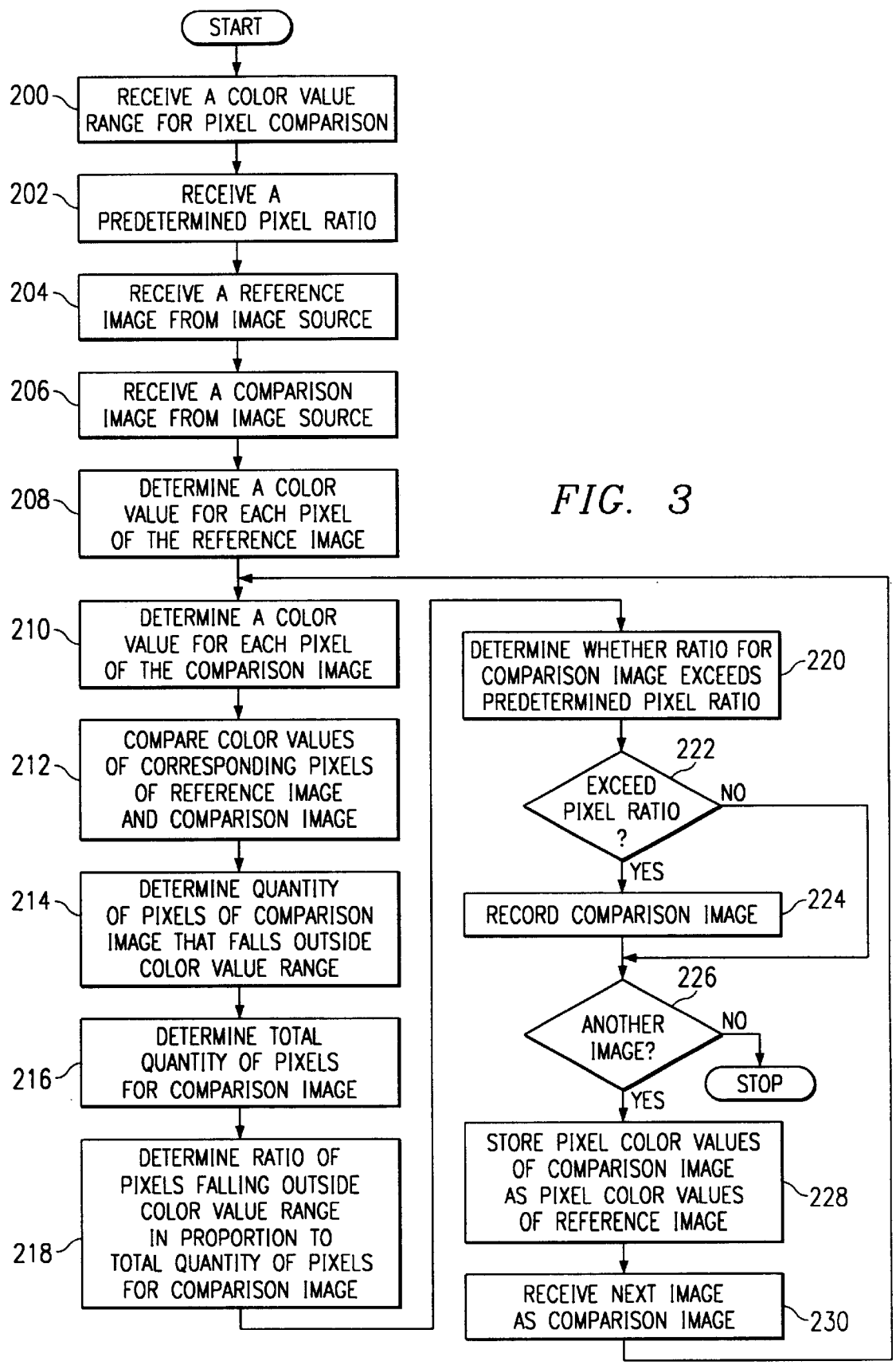
FIG. 3 is a flow chart of an exemplary method for intelligent image recording in accordance with an embodiment of the present invention.

FIG. 3 is a flow chart of an exemplary method for intelligent image recording in accordance with an embodiment of the present invention. The method begins with step 200, where a color value range for pixel comparison is received. As described above in connection with FIG. 2, a pixel color value range may be specified by a user of intelligent image recording system 10 using input device 14. The pixel color value range may be specified for determining a required pixel color variation between a comparison image and a reference image.

At step 202, a predetermined value for a pixel ratio may be specified. As described above in connection with FIG. 2, a pixel ratio may be specified for determining whether a pixel ratio determined for a comparison image exceeds the predetermined pixel ratio value specified by the user.

At step 204, processor 12 receives a reference image from image source 18. At step 206, processor 12 receives a comparison image from image source 18. As described above in connection with FIG. 1, the reference and comparison images may be received directly from image source 18. However, reference and comparison images may also be received from video capture board 20. These images may also be received from image data 28. For example, images may be received from image source 18 and stored as image data 28. Images may then be received directly from image data 18.

At step 208, comparison application 24 determines a color value for each pixel of the reference image. At step 210, comparison application 24 determines a color value for each pixel of the comparison image. At step 212, comparison application 24 compares the color values for each pixel of the reference image with the color values for each corresponding pixel of the comparison image.

At step 214, comparison application 24 determines a quantity of pixels of the comparison image that fall outside of the color value range specified at step 200. For example, comparison application 24 determines whether each pixel of the comparison image exceeds a color value of the corresponding pixel of the reference image by the color value range specified at step 200.

At step 216, comparison application 24 determines a total quantity of pixels of the comparison image. At step 218, comparison application 24 determines a pixel ratio for the comparison image. For example, the pixel ratio of the comparison image may represent the quantity of pixels of the comparison image exceeding the color value range specified at step 200 in proportion to the total quantity of pixels of the comparison image. For example, one thousand pixels may collectively represent the comparison image. However, comparison application 24 may determine that two hundred pixels of the comparison image fall outside the color value range specified at step 200 when compared to corresponding pixels of the reference image. Therefore, a pixel ratio for the comparison image may be equal to twenty percent.

At step 220, comparison application 24 determines whether the pixel ratio determined at step 218 for the comparison image exceeds the predetermined pixel ratio value specified at step 202. If the pixel ratio determined for the comparison image exceeds the predetermined pixel ratio value, the method proceeds to step 224, where the comparison image is recorded. If the pixel ratio for the comparison image does not exceed the predetermined pixel ratio value, the method proceeds directly to step 226.

At step 226, comparison application 24 determines whether comparison of another image is required. If comparison of another image is not required, the method ends. If comparison of another image is required, the method proceeds to step 228, where the pixel color values for the image recorded at step 224 are identified as the pixel color values of a new reference image. Thus, the recorded comparison image now becomes a reference image to be used for comparison with the next image. At step 230, processor 12 receives the next image from image source 18 and identifies the next image as a comparison image. The method then returns to step 210 where comparison application 24 determines a color value for each pixel of the new comparison image.

It will be understood that in this described method, certain steps may be omitted or accomplished in a sequence different from that depicted in FIG. 3. For example, step 202 of receiving a predetermined pixel ratio might be accomplished between steps 218 and 220, just prior to step 220 of determining whether the ratio for the comparison image exceeds the predetermined pixel ratio. Also, it will be understood that the method depicted may be altered to encompass any of the other features or aspects of the invention as described elsewhere in the specification.

For instance, although the preferred embodiments incorporate criteria such as pixel ratios and pixel color value ranges, it should be recognized that other criteria may be used in accordance with the teachings herein. For example, any condition of image recording that might change from image to image could be used as a criteria for purposes of comparing the reference and comparison images.

Although the present invention has been described in detail, it should be understood that various changes, substitutions, and alterations can be made hereto without departing from the spirit and scope of the invention as defined by the appended claims.

What is claimed is:

1. A method for intelligent image recording, comprising:

receiving from an image source a first image comprising a plurality of first image pixels;

receiving from the image source a second image comprising a plurality of second image pixels, each second image pixel corresponding with one of the plurality of first image pixels;

determining a color value for each first image pixel;

determining a color value for each second image pixel;

for each second image pixel, determining a variation amount between the color value of the second image pixel and the color value of the first image pixel corresponding with the second image pixel, and determining whether the variation amount exceeds a color value range;

determining the number of the plurality of second image pixels for which the variation amount exceeds the color value range;

determining a pixel ratio for the second image, the pixel ratio comprising the number of second image pixels for which the variation amount exceeds the color value range in proportion to the number of the plurality of second image pixels; and recording the second image if the pixel ratio exceeds a predetermined pixel ratio value.

2. The method of claim 1, wherein the plurality of first image pixels defines only a portion of the first image.

3. A method for intelligent image recording, comprising:

receiving from an image source a first image comprising a plurality of first image pixels, each having an associated color;

receiving from the image source a second image comprising a plurality of second image pixels, each second image pixel corresponding with one of the plurality of first image pixels and having an associated color;

determining a color value for each first image pixel;

determining a color value for each second image pixel;

for each second image pixel, determining a variation amount between the color value of the second image pixel and the color value of the first image pixel corresponding with the second image pixel, and determining whether the variation amount exceeds a color value range threshold, wherein the variation amount determined for at least one second image pixel is greater than zero but less than the color value range threshold;

determining a quantity of second image pixels for which the variation amount exceeds the color value range;

if the quantity exceeds a predetermined quantity, recording the second image, including recording the color associated with each of the at least one second image pixels for which the determined variation amount is greater than zero but less than the color value range threshold.

4. The method of claim 3, wherein the plurality of first image pixels defines only a portion of the first image.

5. An intelligent image recording system, comprising:

a processor operable to receive a first image and a second image from an image source;

a computer-readable storage medium;

a computer program encoded on the computer-readable storage medium and executable by the processor, the computer program operable to:

receive from an image source a first image comprising a plurality of first image pixels;

receive from the image source a second image comprising a plurality of second image pixels, each second image pixel corresponding with one of the plurality of first image pixels;

determine a color value for each first image pixel;

determine a color value for each second image pixel;

for each second image pixel, determining a variation amount between the color value of the second image pixel and the color value of the first image pixel corresponding with the second image pixel, and determining whether the variation amount exceeds a color value range;

determine the number of the plurality of second image pixels for which the variation amount exceeds the color value range;

determine a pixel ratio for the second image, the pixel ratio comprising the number of second image pixels for which the variation amount exceeds the color value range in proportion to the number of the plurality of second image pixels; and cause recording of the second image if the pixel ratio exceeds a predetermined pixel ratio value.

6. The system of claim 5, wherein the plurality of first image pixels defines only a portion of the first image.

7. An intelligent image recording system, comprising:

a processor operable to receive a first image and a second image from an image source;

a computer-readable storage medium;

a computer program encoded on the computer-readable storage medium and executable by the processor, the computer program operable to:

receive from an image source a first image comprising a plurality of first image pixels, each having an associated color;

receive from the image source a second image comprising a plurality of second image pixels, each second image pixel corresponding with one of the plurality of first image pixels and having an associated color;

determine a color value for each first image pixel;

determine a color value for each second image pixel;

for each second image pixel, determine a variation amount between the color value of the second image pixel and the color value of the first image pixel corresponding with the second image pixel, and determining whether the variation amount exceeds a color value range threshold, wherein the variation amount determined for at least one second image pixel is greater than zero but less than the color value range threshold;

determine a quantity of second image pixels for which the variation amount exceeds a color value range;

if the quantity exceeds a predetermined quantity, cause recording of the second image, including recording the color associated with each of the at least one second image pixels for which the determined variation amount is greater than zero but less than the color value range threshold.

8. The system of claim 7, wherein the plurality of first image pixels defines only a portion of the first image.

9. The method of claim 1, wherein at least one of the first and second images is a digitized image received from a video capture board.

10. The method of claim 1, further comprising capturing a plurality of digitized images, each digitized image representing an analog frame, and wherein receiving a first image and a second image from an image source comprises receiving a first digitized image and a second digitized image from the plurality of digitized images.

11. The method of claim 1, wherein recording the second image further comprises recording the second image with a time stamp.

12. The method of claim 1, wherein receiving a second image comprises receiving a second image from the image source, the second image immediately following the first image in a series of images.

13. The method of claim 3, wherein at least one of the first and second images is a digitized image received from a video capture board.

14. The method of claim 3, wherein recording the second image further comprises recording the second image with a time stamp.

15. The method of claim 3, wherein receiving a second image comprises receiving a second image from the image source, the second image immediately following the first image in a series of images.

16. The system of claim 5, wherein the image source comprises a video capture board, the video capture board operable to capture the first and second images as digital representations of a first analog frame and a second analog frame.

17. The system of claim 5, wherein the computer program is further operable to capture a plurality of digitized images, each digitized image representing an analog frame, and wherein receiving a first image and a second image from an image source comprises receiving a first digitized image and a second digitized image from the plurality of digitized images.

18. The system of claim 5, wherein the computer program is operable to cause recording of the second image with a time stamp.

19. The system of claim 5, wherein the second image immediately follows the first image in a series of images.

20. The system of claim 7, wherein the image source comprises a video capture board, the video capture board operable to capture the first and second images as digital representations of a first analog frame and a second analog frame.

21. The system of claim 7, wherein the computer program is operable to cause recording of the second image with a time stamp.

22. The system of claim 7, wherein the second image immediately follows the first image in a series of images.

23. A method for recording images comprising:

receiving a plurality of images, including a first image and a second image, the first image comprising a plurality of first image pixels, each first image pixel having a color value, and the second image comprising a plurality of second image pixels, each second image pixel each first image pixel having a color value and corresponding with one of the plurality of first image pixels;

for each of the plurality of second image pixels, determining a variation amount between the color value of the second image pixel and the color value of the corresponding first image pixel;

determining a first quantity of the plurality of first image pixels;

determining a second quantity of second image pixels for which the variation amount between the color value of the second image pixel and the color value of the corresponding first image pixel exceeds a predetermined color value range;

determining a pixel ratio for the second image, the pixel ratio comprising the second quantity of pixels in proportion to the first quantity of pixels; and recording the second image if the pixel ratio exceeds a predetermined ratio value.

24. The method of claim 17, wherein the plurality of first image pixels defines only a portion of the first image.

25. The method of claim 17, wherein the plurality of images comprises a series of images, and wherein the first and second images comprise sequential images of the series.

26. The method of claim 17, wherein the plurality of images comprises a plurality of analog images, and wherein the first and second images comprise digitized images of a first analog frame and a second analog frame, respectively.

* * * * *